(12) United States Patent  (10) Patent No.: US 9,022,856 B2
Men et al.                      (45) Date of Patent:    May 5, 2015

(54) SYSTEM AND METHOD FOR QUEUING PLAYERS OF CASINO GAMES FOR REBATES

(71) Applicants: Li Men, Richmond (CA); Boxu Men, Richmond (CA)

(72) Inventors: Li Men, Richmond (CA); Boxu Men, Richmond (CA)

(*) Notice: Subject to any disclaimer, the term of this patent is extended or adjusted under 35 U.S.C. 154(b) by 80 days.

(21) Appl. No.: 13/901,237

(22) Filed: May 23, 2013

(65) Prior Publication Data

US 2014/0349740 A1    Nov. 27, 2014

Related U.S. Application Data

(63) Continuation-in-part of application No. 13/839,407, filed on Mar. 15, 2013, now abandoned.

(51) Int. Cl.
 *A63F 13/792* (2014.01)
 *G07F 17/32* (2006.01)

(52) U.S. Cl.
 CPC .................................. *G07F 17/3244* (2013.01)

(58) Field of Classification Search
 CPC . G07F 17/32; G07F 17/3225; G07F 17/3244; G07F 17/3255
 USPC .......... 463/25, 34, 42; 705/14.1, 14.12, 14.34
 See application file for complete search history.

(56) References Cited

U.S. PATENT DOCUMENTS

| | | | |
|---|---|---|---|
| 7,771,272 B2 | 8/2010 | Soltys et al. | |
| 7,775,887 B2 | 8/2010 | Kuhn et al. | |
| 7,914,370 B2* | 3/2011 | Weller | 463/16 |
| 7,976,372 B2 | 7/2011 | Baerlocher et al. | |
| 8,182,321 B2 | 5/2012 | Chun | |
| 2005/0096124 A1* | 5/2005 | Stronach | 463/25 |
| 2007/0265054 A1* | 11/2007 | Walker et al. | 463/16 |
| 2008/0039189 A1* | 2/2008 | Walker et al. | 463/25 |
| 2009/0048017 A1 | 2/2009 | Palmisano | |
| 2011/0244950 A1* | 10/2011 | Walker et al. | 463/25 |
| 2012/0322544 A1 | 12/2012 | Rowe et al. | |

\* cited by examiner

*Primary Examiner* — Omkar Deodhar
*Assistant Examiner* — Allen Chan
(74) *Attorney, Agent, or Firm* — Jeanette Meng Nakagawa

(57) ABSTRACT

A system and method for queuing players of casino games for rebates is provided. The rebate queuing system of the present invention caches game play data received from electronic game tables, electronic gaming machines, and online casinos in a game server and generates invoices, each of which associates with a gaming transaction of an identified player. The invoices are sent to a rebate queue management server to be processed and queued for rebate credits. Enqueuing credits are determined based on the information extracted from the invoices, and are divided into a plurality of values according to the decimal number system. Based on the divided values, a new queue number is added to each of the corresponding rebate queues. When a queue number becomes the current rebate number of a rebate queue, the player associated with the queue number receives a corresponding amount of rebate credits.

24 Claims, 12 Drawing Sheets

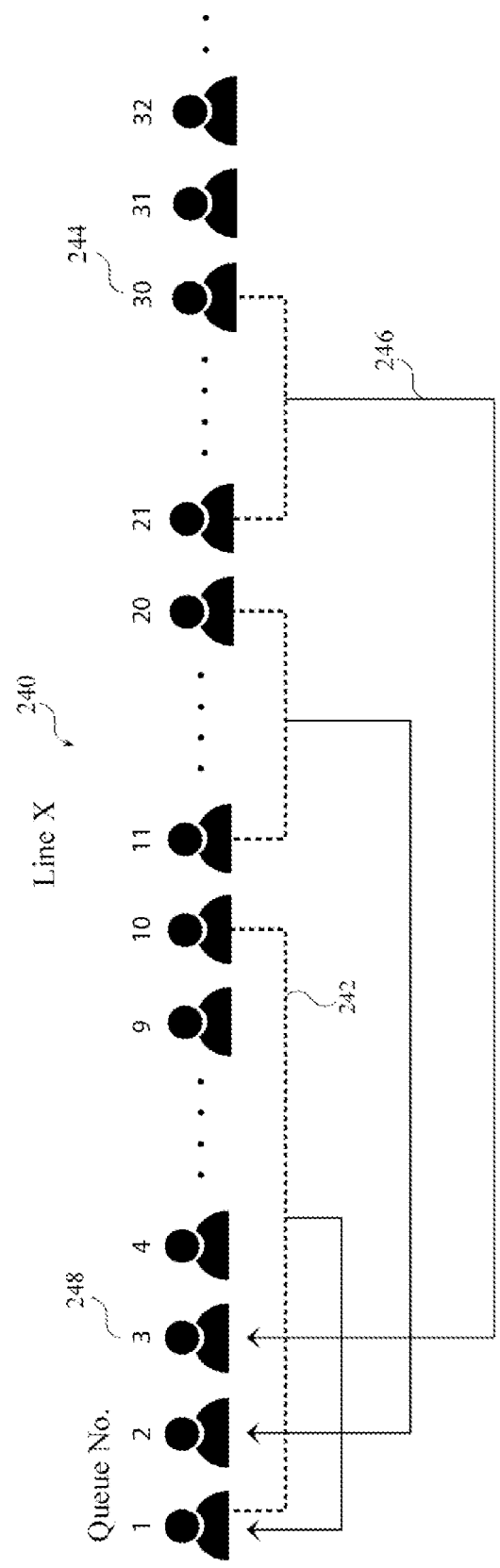

SYSTEM AND METHOD FOR QUEUING PLAYERS OF CASINO GAMES FOR REBATES

CROSS-REFERENCE TO RELATED APPLICATIONS

The present invention is a continuation-in-part of application Ser. No. 13/839,407, filed on Mar. 15, 2013.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Technical Field

The present invention is directed to a system and method for queuing players of casino games for rebates, and more specifically, to a queuing system and method for providing rebates to losing players of wagering games at casinos.

2. Background Art

With the rapid advancement of electronic and information technologies, the gambling industry has innovated various new techniques of gaming and promotion to increase casino patronage and business manageability. "Casinos" referred to in the present disclosure includes all types of gaming properties, such as casinos, cruise ships, riverboats, etc, as well as virtual gaming venues, such as online casinos. Moreover, the term "casino" may be used to mean a particular gaming property, a group of associated gaming properties and/or an entity that owns one or more gaming properties.

A classical example is the extensive use of cashless ticketing system, wherein tickets are issued to gambling players in replacement of cash; such tickets may be used in playing different electronic gaming machines and may be taken to a cashier or a service kiosk for cash redemption. Such cashless system provides gambling players a simple and secure mean to transport wagers around the casino and reduces labor costs in regular casino operations.

Another example is the incorporation of display devices at game tables, or commonly known as electronic game tables. Such table includes individualized displays installed at each player position or a multiplayer interactive display/input device covering all or a portion of the upper surface of the game table. The displays may portray virtual playing cards or symbols to reflect instant game play to the participating players. If further combined with game tracking devices, such as optical imagers or detectors, configured to identify and track the movements of playing cards and/or casino chips on a game table during game sessions, various metrics of activity on the game table may be monitored and digitized for regulatory, accounting, and promotional purposes.

Taking advantage of the broad popularity of the Internet, an increasing number of casinos have transitioned into a networked operating environment to provide their patrons more funding and promotional options. For instance, gambling players are provided store value cards or may electronically transfer funds from their commercial banking accounts for their game plays, and may access coupons, vouchers, or other gaming incentives from locations other than the casino floor. The development of the Internet also gives rise to various online casinos, where players at different geological locations may participate in the same wagering game at the same time on the online casino website.

New game rules and reward mechanisms have also been created in an attempt to attract new casino customers and to keep frequent gambling players enticed. Common measures include offering bonus credits or different award levels for game wins or a second game or at a randomly selected gaming machine, raising game pay-out rates for winners, and prompting players to participate in player loyalty programs.

However, in actual gaming situations, it is well known that casinos own higher winning odds, or house advantages, than the patrons in the majority of games on the casino floor. It is far from unusual that a gambling player enters a casino property with a pocket full of hope but ends up losing money and leaving with disappointment, if not with anger. The situation is especially unwelcoming for short-stay visitors or occasional casino patrons, and thus significantly reduces the time patrons spend on the casino floor or at the games, or even their will to return to the casino property in the future. Among all the various reward approaches currently exist, none of them targets the large game-losing population. Accordingly, an apparent need exists to provide incentives or rewards to losing players of casino games to more effectively increase casino patronage and revenue.

SUMMARY OF THE INVENTION

The present invention provides a system and method for queuing players of casino games for rebates. The system includes a game server connected to or in communication with a gaming terminal, having a card reading device, an electronic game table, and/or an electronic gaming machine or being an online casino, and a rebate queue management server connected to or in communication with the game server. The game server caches game play data of identified players and generates invoices associated with the identified players and their game play results when a predetermined duration of time is reached.

The invoices are sent to the rebate queue management server in which information contained in the invoices is extracted. Gaming transactions associated with negative overall game results are entered into the proceeding processing units for rebate queuing, while those associated with positive overall game results are stored in the databases of the rebate queue management server. The processing units include a calculation unit for determining the amount of credit to be enqueued, a division unit for dividing the enqueuing credits into a plurality of values according to the decimal number system, a queue unit for adding new queue numbers into the corresponding rebate queues according to the divided values, a second calculation unit for determining the current rebate number of the rebate queues, a third calculation unit for deducting transaction fees from the rebate credits to be released to the players, and a rebate unit for transferring the rebate credits to credit accounts of the identified players.

In an alternative embodiment, the system also includes a cash-in control unit to hold the rebate credits in the players' credit accounts for a predetermined duration of time to prevent the rebate credits from being transferred to the players' debit accounts and be cashed in right away.

It is therefore an advantage of the present invention to provide rebates in the form of game credits to players who lost their casino games, thus offering the players a strong incentive to return to the games and spend more time on the casino floor.

Another advantage of the present invention is to provide a credit holding function that lengthens the time rebate credits stay as game credits, thus prompting the players to use the rebate credits on more casino games instead of cashing-in those credits too soon.

A further advantage of the present invention is to provide controllable variables in the queuing process, allowing adjustable amount and speed of rebate releases to enhance business manageability.

Yet another advantage of the present invention is to provide a rebate queuing system applicable to general commercial transactions taken place in conventional offline stores, online shops, and/or e-malls.

Other features and advantages of the present invention will become apparent from the following detailed description, taken in conjunction with the accompanying drawings, which illustrate by way of example, the features of the various embodiments.

BRIEF DESCRIPTION OF THE DRAWINGS

The preferred embodiments of the invention will in the following be further described, in a non-limiting manner, and with reference to the accompanying drawings, in which:

FIG. 5B illustrates a queuing process in accordance with the rebate queuing method of the present invention.

DETAILED DESCRIPTION OF THE INVENTION

The following provides a detailed description of the embodiments of the present invention. Please note that the embodiments described herein are merely exemplary and are not meant to limit the scope of the present invention.

System of Operation

Figure 1:
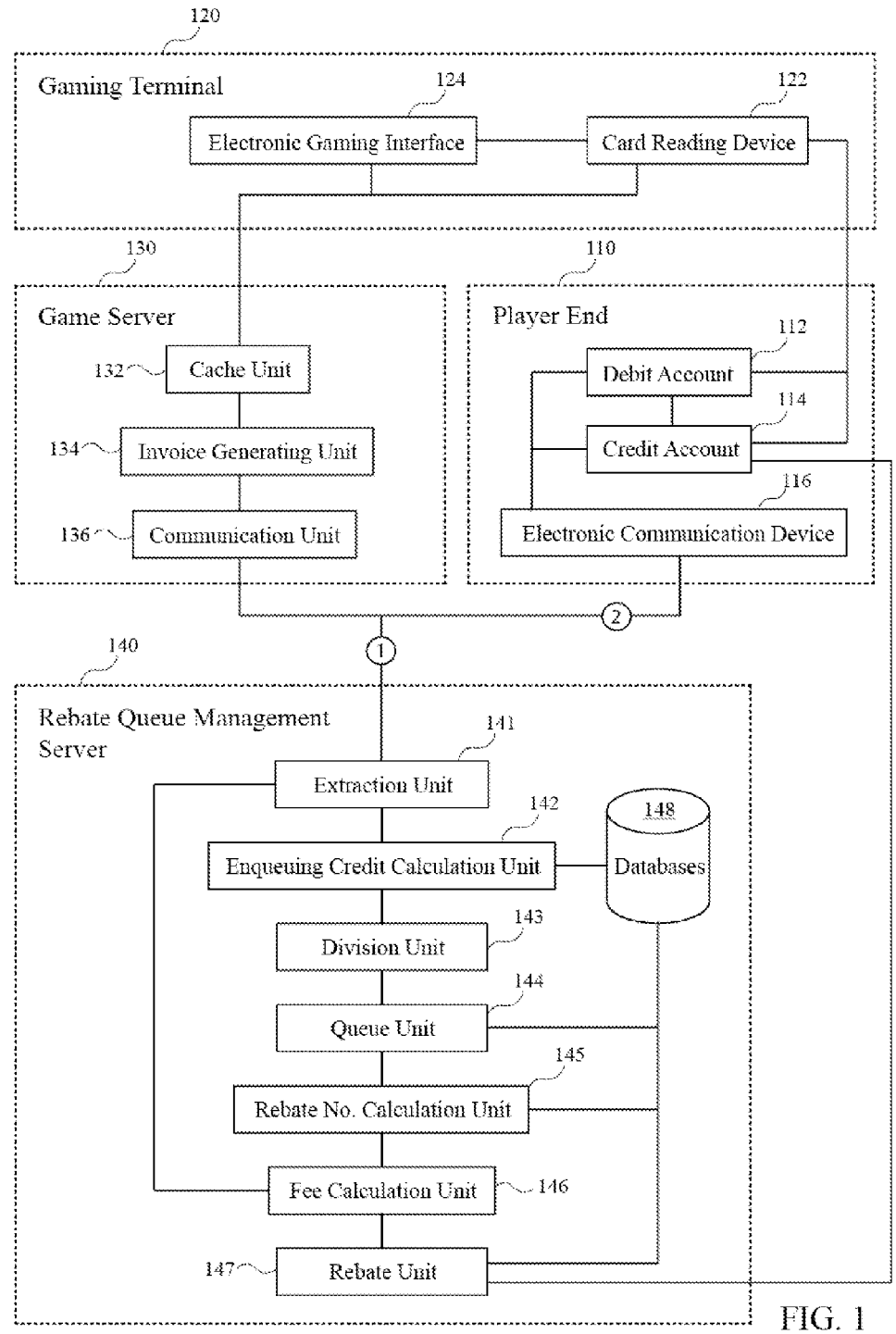
FIG. 1 is a schematic view of one embodiment of the rebate queuing system of the present invention.
Figure 2:
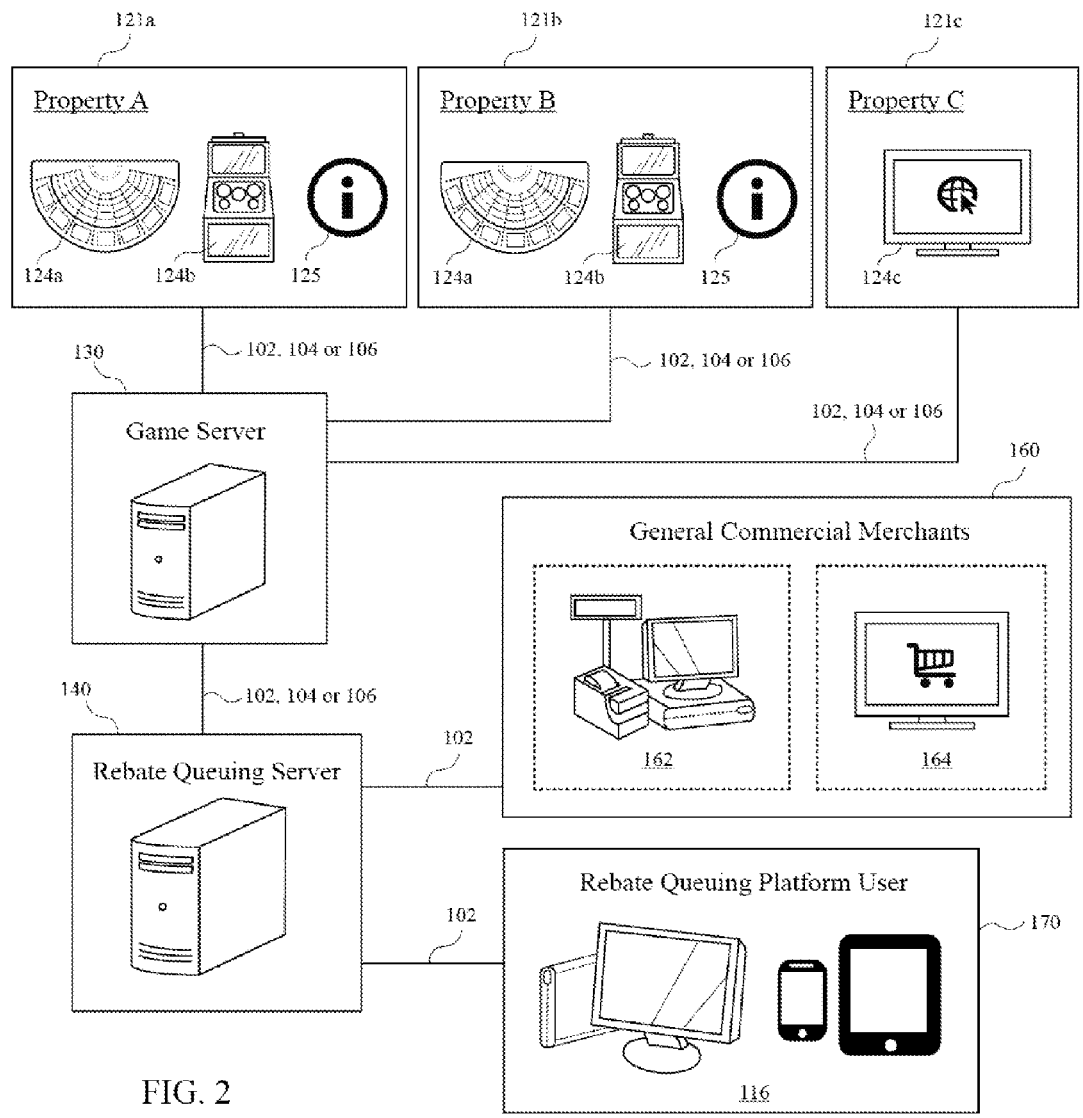
FIG. 2 is a perspective view of the one embodiment of the rebate queuing system network of the present invention.

Referring now to the drawings and in particular to FIGS. 1 and 2, the rebate queuing system and the system network of the present invention includes a Player End 110, a Gaming Terminal 120, a Game Server 130, and a Rebate Queue Management Server 140. Upon registration for a membership to the rebate queuing platform of the present invention by a gambling player at a service center 125 in one of the affiliated gaming properties, such as 121*a* and 121*b*, or at an online casino 121*c*, the gambling player is issued a debit account 112 and a credit account 114 (It should be appreciated that the system network is preferably adapted to serve any number of gaming properties and is not limited to the three illustrated in the schematic diagram of FIG. 2) The player must use cash or virtual cash to purchase game credits and may choose how much purchased game credits to save in each given account. The player may manage the accounts, including transferring credits between the two accounts, at any time via their electronic communication devices 116, such as mobile phones, smartphones, tablet computers, or desktop computers. However, to facilitate casino management, rebate credits received from the rebate queue management server 140 may only enter the credit accounts 114, while only the credits in the debit accounts 112 may be cashed in at a casino affiliated with the rebate queuing platform of the present invention.

In addition to opening accounts for members to store their game credits, affiliated casinos will also issue cards associated with each given accounts to the members. The card may be, but is not limited to, a barcode card, magnetic stripe card, RFID card, or smartcard, and the choice of card type used in a specific casino or a group of associated casinos may be decided upon each casino's need or the agreement between the casino(s) and the rebate queuing platform of the present invention. Likewise, the use of the card may be limited to a certain casino and/or a group of associated casinos based on each casino's need or the agreement between the casino and the rebate queuing platform. Online casinos need not issue any actual cards to registered players, but may provide PINs or passwords, or require the players to set up PINs, passwords, and/or answers to security questions of their preference for player identification purposes.

Cards issued to registered players are readable on a card reading device 122 associated with an electronic gaming interface 124 at the Gaming Terminal 120. The electronic gaming interface 124 may be an electronic game table 124*a*, an electronic gaming machine 124*b*, or an online casino game 124*c*; the electronic game table may include, but is not limited to, game tables for Baccarat, Blackjack, Poker, Roulette, Craps, Touch Bet, EZ Baccarat, Fortune, Pai Gow Poker, Pai Gow Tiles, Four Card Poker, Texas Shootout, and Three Card Poker; the electronic gaming machine may include, but is not limited to, slot machines, Pachinko machines, and electronic Baccarat machines; and the online casino game may include all games mentioned above.

The electronic game table 124a may be equipped with game tracking devices, such as optical imagers and/or detectors, capable of identifying playing cards, detecting electronic casino chips, and tracking the movements of playing cards and/or casino chips on a game table during game sessions. The electronic game table may also be equipped with display/input devices from which players may place bets; the display devices may be configured to display instant game play and game results of each game session according to the predetermined game rules.

The card reading device 122 associated with the electronic gaming interface 124 is in communication with the debit account 112 and the credit account 114 at the Player End 110, and adapted for identifying players and relating the players to their debit and credit accounts. Depending on the type of card the casino, or group of casinos, has chosen to issue to their players, the card reading device may read players' cards via scanning, swiping, inserting, or sensing. On the other hand, players at online casinos may enter their account numbers, and whenever necessary, PINS, passwords, and/or answers to selected security questions, for player identification and secure login.

With further reference to FIG. 1, the Game Server 130 includes a cache unit 132, an invoice generating unit 134, and a communication unit 136. The cache unit 132 is in communication with the card reading device 122 and the electronic gaming interface 124 at the Gaming Terminal 120 via the Internet 102, a local area network (LAN) 104, or a wide area network (WAN) 106, and adapted for temporary storing instant game play data of gambling players identified by the card reading device. The Game Server is configured to associate each identified player with his/her instant game play data, which is further processed in the Game Server before being sent to the Rebate Queue Management Server 140 for rebate queuing. The Game Server may be located at the casinos or with the Rebate Queue Management Server.

Invoice generating unit 134 is coupled to the cache unit 132 and adapted for generating an invoice associated with terminated game sessions, or gaming transactions, of an identified player played during a predetermined duration of recording time, such as 12 hours or preferably 24 hours. This predetermined recording time may be determined based on each casino's need or the agreement between the casino(s) and the rebate queuing platform of the present invention. For rebate queuing calculation and system record purposes, the generated invoice must contain, but is not limited to, name of player, casino code, date and time entering and existing each game session played during the predetermined recording time, and the corresponding game codes, accounts used, and game credits available to the player at time of entering and exiting each game session. In addition, the invoice number assigned to each invoice is based on the time the player entering his/her first game session during the predetermined recording time and increases in accordance with the order of natural numbers; in other words, the earlier a player enters his/her first game at a casino property, the sooner the invoice generating unit generates an invoice associated with the terminated game sessions played by the player during the predetermined recording time, and thus the smaller the invoice number that specific invoice receives.

The communication unit 136 is coupled to the invoice generating unit 134 and in communication with the Rebate Queue Management Server 140 via the Internet 102, a local area network (LAN) 104, or a wide area network (WAN) 106, for sending the generated invoice to the Rebate Queue Management Server for rebate queuing. Furthermore, upon the entrance of an invoice into the Rebate Queue Management Server, the communication unit will also deliver a confirmation message and/or email to one or more electronic communication devices of the associated player via the Internet, prompting the player to visit the rebate queuing platform website and to follow-up on the rebate queuing statuses of his/her gaming transactions.

Referring again to FIG. 1, the Rebate Queue Management Server 140 include an extraction unit 141, an enqueuing credit calculation unit 142, a division unit 143, a queue unit 144, a rebate number calculation unit 145, a fee calculation unit 146, a rebate unit 147, and a plurality of databases 148. The Rebate Queue Management Server is configured to associate each identified player with his/her credit account.

The extraction unit 141 is in communication with the communication unit 136 at the Game Server 130, and is adapted for extracting information provided in an invoice received from the communication unit. The extracted information may include, but is not limited to, name of player, player's credit account number, casino code, date and time entering and existing each game sessions played during the predetermined recording time, and the corresponding game codes, accounts used, and game credits available to the player at time of entering and exiting each game session; discount rate, cycle number of rebate queues, and transaction fee rate associated with the invoice are obtained from the extracted casino code. Both the discount rate and the transaction fee rate may fall between the range of 0.1%-99.9%, inclusive, and the cycle number may be any natural number larger than 1. The specific values of these variables may be decided upon each casino's need or the agreement between the casino(s) and the rebate queuing platform of the present invention.

The enqueuing credit calculation unit 142 is coupled to the extraction unit 141 for determining if an invoice qualifies for a rebate and calculating the total amount of credits to be enqueued, or to be placed in the rebate queues, based on the extracted gaming transaction information. In the case of rebating only the losing players, invoices having negative overall game results are directed to the next unit in the Rebate Queue Management Server for rebate queuing, and those with positive or zero overall game results are sent to and stored in the databases of the Server.

The division unit 143 is coupled to the enqueuing credit calculation unit 142, and is adapted for dividing the calculated enqueuing credits according to the decimal number system; for example, 777 will be divided into 3 numbers, including 700, 70, and 7; likewise, 4040 will be divided into 4000 and 40.

The queue unit 144 is coupled to the division unit 143 for adding a new queue number to each corresponding rebate queue, or Line, and assigning the queue numbers to the associated invoice; for example, all possible queues of the hundreds are 100, 200, 300, 400, 500, 600, 700, 800, and 900; thus, in the case of 777 enqueuing credits, Line 700, Line 70, and Line 7 will be each added one new queue number; and if Line 700 has n queue numbers, n+1 will be assigned to the associated invoice as its queue number for Line 700. In addition, the Lines are queued according to the invoice number; that is, invoices having smaller invoice numbers enter the Lines earlier and obtain smaller queue numbers, meaning that players associated with those invoices will receive their rebate credits earlier than others who associate with invoices entered the system at a later time point.

The rebate number calculation unit 145 is coupled to the queue unit 144, and is adapted for calculating the current rebate number upon the entrance of a new queue number into a Line, to determine if the system is ready to release a rebate to a particular queue number. Meanwhile, an optional special number setup unit coupled to the rebate number calculation unit 145 may be added to the system for presetting one or a series of special numbers. An invoice having a queue number that meets at least one of the criteria of a special number may skip the Line immediately, meaning that the associated player may receive an instant rebate of game credits. However, when that queue number later becomes a current rebate number, the system will not release a second rebate to the associated player.

The fee calculation unit 146 is coupled to the extraction unit 141 and the rebate number calculation unit 145, and is adapted for calculating the actual amount of rebate credits to be released to the associated player based on the amount of credit each queue number enqueued in a Line and the cycle number and transaction fee rate as extracted by the extraction unit 141.

The rebate unit 147 is coupled to the fee calculation unit 146 and in communication with the credit account 114 at the Player End 110 via the Internet, and is adapted for transferring the actual amount of rebate credits as calculated by the fee calculation unit 146 into the associated player's credit account 114.

The databases 148 are coupled to the enqueuing calculation unit 142, the queue unit 144, the rebate number calculation unit 145, and the rebate unit 147, and is adapted for storing invoice information and the corresponding queuing and rebate data for users of the rebate queuing platform of the present invention 170, including gambling players and casino managers, to view and manage on the platform website via their electronic communication devices, such as mobile phones, smartphones, tablet computers, or desktop computers.

Referring again to FIG. 2, the rebate queuing system of the present invention may perform parallel communications with a plurality of gaming properties and online casinos. In this way, gaming transactions taken place in a casino or a group of associated casinos located at different geological locations around the globe may enter the same set of rebate queues, resulting in a significant increase in the frequency of rebate releases. Preferably, a gambling player who lost money on casino games on one day may receive his/her rebate credits right on the next day, offering the player a strong incentive to return to the casino games and spend more time on the casino floor.

Besides rebating the losing players, it should be appreciated that the rebate queuing system of the present invention may also be used to award game winners, providing a novel and innovative reward mechanism to the gambling industry.

Furthermore, the rebate queuing system of the present invention may be integrated with the general commercial fields. When connecting the Rebate Queue Management Server to a point of sale (POS) device 162 installed in a regular store offering goods or services for purchase or a host system of an online shop or e-mall 164 via the Internet 102, the rebate queuing system would be capable of processing and queuing general commercial transactions taken place in conventional offline stores, online shops, or e-malls 160 that are affiliated with the rebate queuing platform of the present invention; store credits or cash rebates are then released to the associated customers via a standard rebate queuing process.

Figure 3:
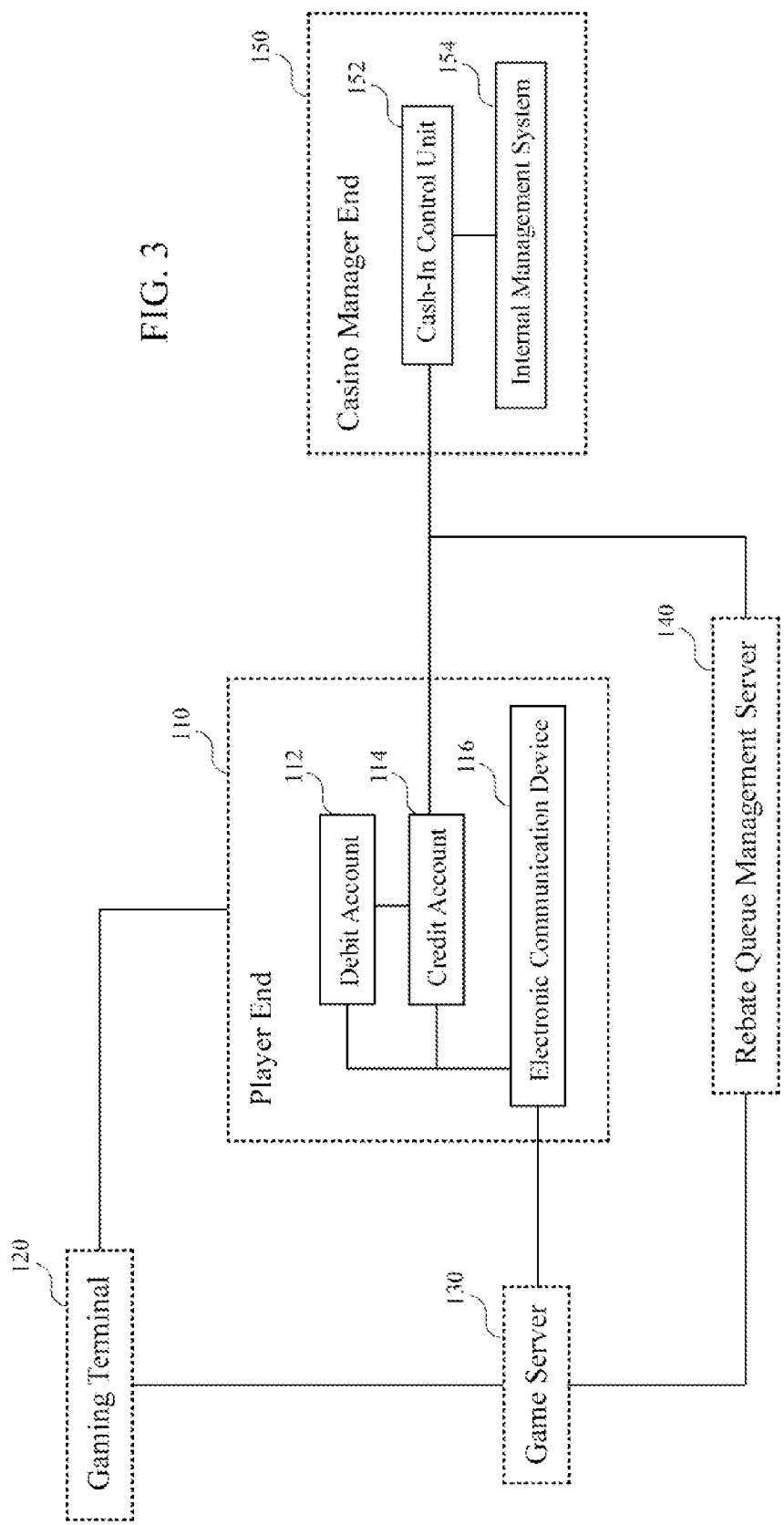
FIG. 3 is a schematic view of one embodiment of the rebate queuing system of the present invention having a credit holding function.

Referring now to FIG. 3, one embodiment of the rebate queuing system of the present invention is illustrated having a Casino Manager End 150, which includes a cash-in control unit 152 and an internal management system 154. The cash-in control unit 152 is in communication with the credit account 114 at the Player End 110 via a local area network (LAN), a wide area network (WAN), or the Internet, and is adapted for blocking rebate credits in a credit account 114 from being transferred to a debit account 112 for a predetermined duration of holding time after the rebate credits are received from the rebate unit 147 at the Rebate Queue Management Server 140. The credit holding function is automatically deactivated once the predetermined duration of holding time, preferably 1 month, has passed, and the rebated players will be allowed to transfer their rebate credits into their debit accounts and cash-in those credits at any time at a cashier in a casino.

The rebate credit holding time provides gambling players another strong incentive to return to the casino games, which could effectively improve the customer return rate of the participating casino(s). The duration of time for which the rebate credits are held in a credit account may be determined according to each casino's need or the agreement between the casino(s) and the rebate queuing platform of the present invention, and may be adjusted via the internal management system 154 connected to the cash-in control unit 152. The internal management system is also adapted to manage and implement other rules related to cashing in game credits saved in a debit or credit account at the casino(s).

Method of Operation

Figure 4:
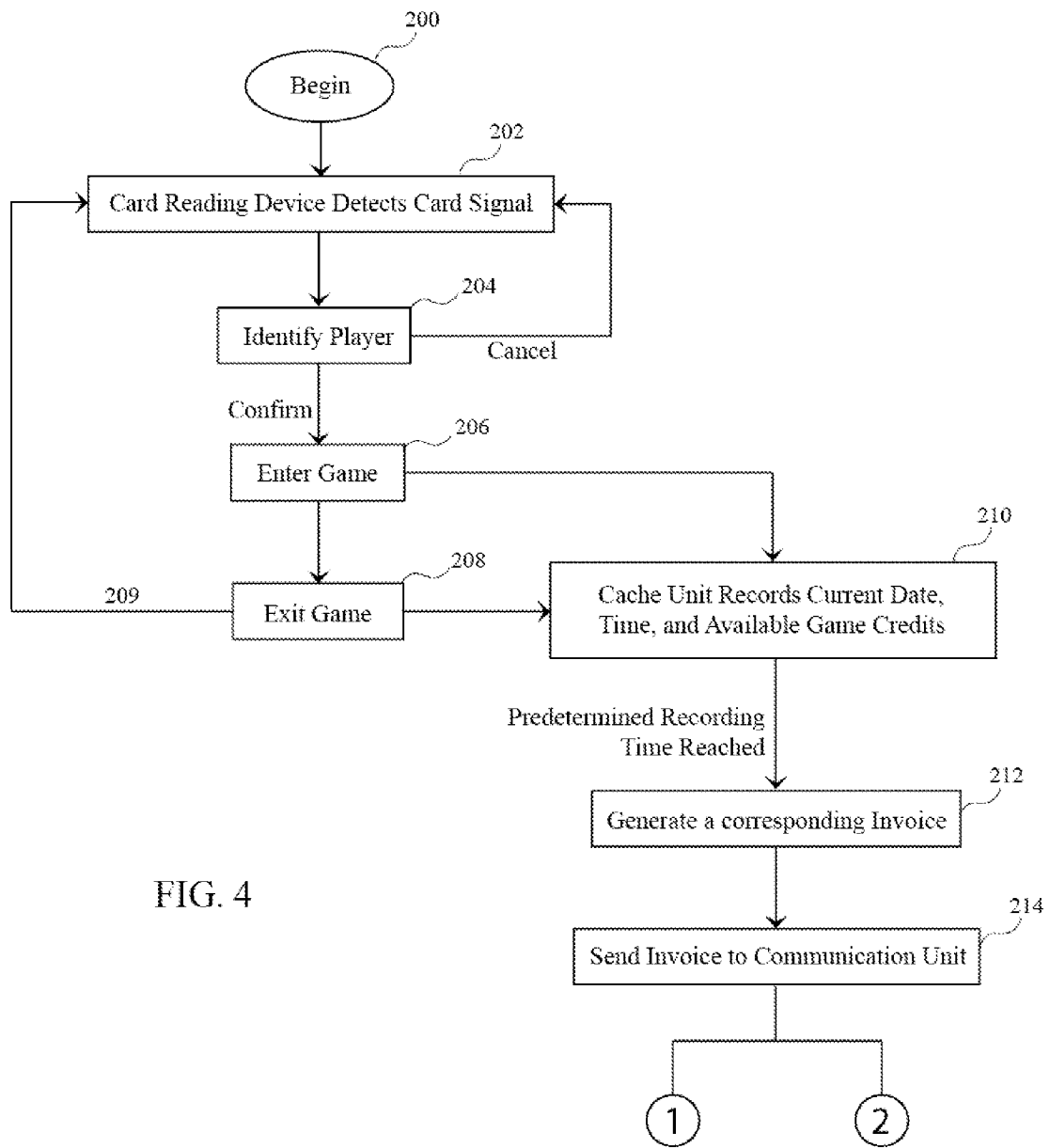
FIG. 4 is a block diagram of a game play data processing portion of one sequence of the rebate queuing method of the present invention.

Referring now to FIGS. 1, 2, and 4 though 6, in which one sequence of operation in accordance with one embodiment of the present invention is schematically illustrated. FIG. 4 illustrates the game play data processing portion of the sequence of operation. When a registered player scans, swipes, inserts, or passes a card associated with his/her debit account 112 or credit account 114 into or by the card reading device 122 at the Gaming Terminal 120, the card reading device receives a signal indicating that the player wishes to enter the electronic gaming interface 124 associated the card reading device, as indicated by block 202.

The electronic gaming interface 124 may be an electronic game table, an electronic gaming machine, or an online casino; the electronic game table may include, but is not limited to, game tables for Baccarat, Blackjack, Poker, Roulette, Craps, Touch Bet, EZ Baccarat, Fortune, Pai Gow Poker, Pai Gow Tiles, Four Card Poker, Texas Shootout, and Three Card Poker; and the electronic gaming machine may include, but is not limited to, slot machines, Pachinko machines, and electronic Baccarat machines.

Once the card reading device 122 successfully detects a card signal, the electronic gaming interface 124 will display information, including name of the player and/or all or partial of the detected account number, to identify the player and the account of his/her choice, as indicated by block 204. Although not illustrated, if the player finds the information incorrect or wishes to use another card or account, the player may choose to cancel and restart card reading. In addition, if the card reading device could not read the card properly, the electronic gaming interface will display messages to prompt the player to re-scan, re-swipe, re-insert, or re-pass the card; this sequence may also be adapted to enable the player to manually key in the account number via an input device, such as a keypad or buttons, or a virtual keypad portrayed on a touch screen display.

After the player is identified and confirmed, the identified player enters the game, as indicated by block 206, and the cache unit 132 at the Game Server 130 immediately records name of the player, player's account number, casino code, game code, date, time, and available game credits in the account, as indicated by block 210. The cache unit records date, time, and available game credits in the account once again when the player exits the game or terminates the game session, as indicated by block 208. The player may start other game sessions, as indicated by arrow 209, and the cache unit will continue record the same set of information for each game session the identified player plays. Upon reaching a predetermined duration of recording time, such as 12 hours or preferably 24 hours since the player started his/her first game at the casino property, or as determined according to the casino's specific needs or the agreement between the casino and the rebate queuing platform of the present invention, the invoice generating unit 134 at the Game Server 130 will collect data on all terminated game sessions cached by the cache unit 132 during the last recording period and generate an invoice containing, but not limited to, name of the player, casino code, date and time entering and existing each game session played during the predetermined recording time, and the corresponding game codes, accounts used, and game credits available to the player at time of entering and exiting each game session, as indicated by block 212.

Figure 6:
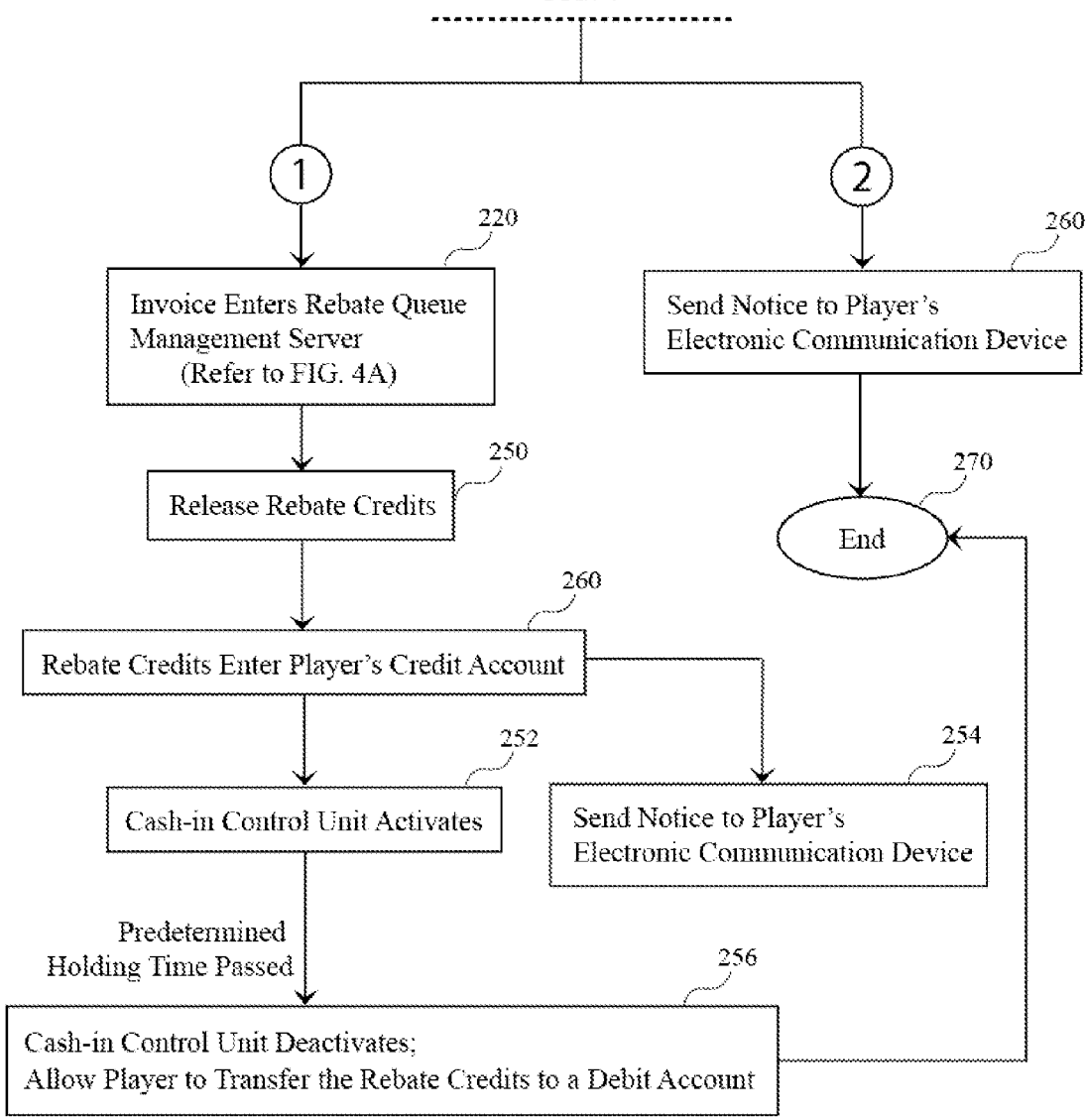
FIG. 6 is a block diagram of a credit holding portion of one sequence of the rebate queuing method of the present invention.

Once the invoice is generated, the invoice is relayed to the communication unit 136 at the Game Server 130, as indicated by block 214. As illustrated in FIG. 6, the communication unit will deliver the invoice to the Rebate Queue Management Server 140 via a local area network (LAN), a wide area network (WAN), or the Internet, as indicated by block 220, and meanwhile, send a confirmation message and/or email to the electronic communication devices of the identified player via the Internet, as indicated by block 260, prompting the player to visit the rebate queuing platform website to follow-up on the rebate queuing statuses of his/her gaming transaction.

Figure 5A:
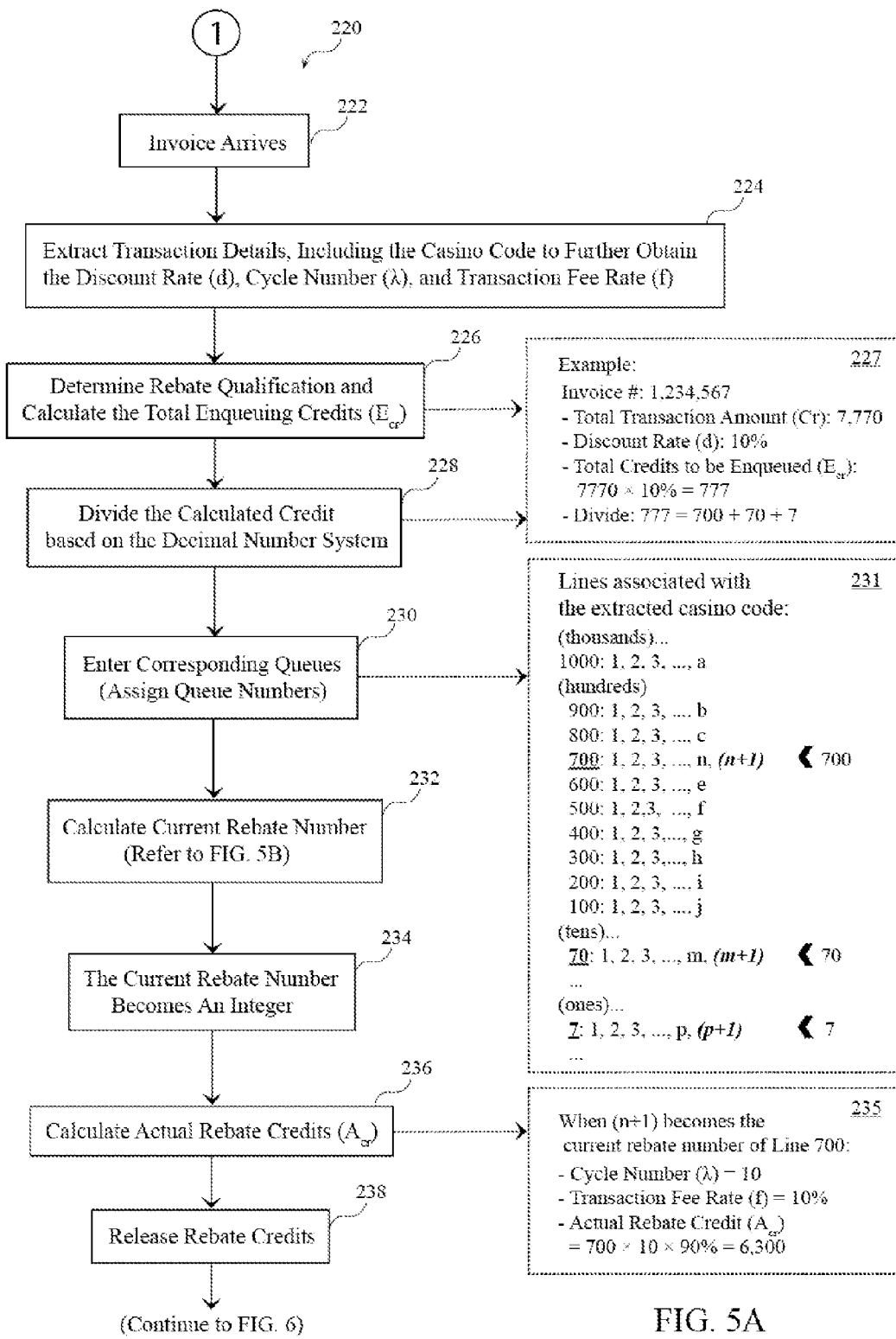
FIG. 5A is a block diagram of a rebate queuing portion of one sequence of the rebate queuing method of the present invention.

Referring now to FIG. 5A, which illustrates the rebate queuing portion of the sequence of the operation. Upon the arrival of an invoice at the Rebate Queue Management Server 140 from the communication unit 136, as indicated by block 222, the extraction unit 141 extracts the information necessary for queuing and rebate calculations from the invoice, including name of the player, player's credit account number, date and time entering and existing each game session, and the corresponding game codes, accounts used, game credits available to the player at each game session, and casino code, from which discount rate, cycle number of rebate queues, and transaction fee rate may be obtained, as indicated by block 224. Both the discount rate and the transaction fee rate may fall between the range of 0.1%-99.9%, inclusive, and the cycle number may be any natural number larger than 1. The specific values of these variables are decided upon each casino's need or the agreement between the casino(s) and the rebate queuing platform of the present invention.

After the required information is extracted, the enqueuing credit calculation unit 142 determines if the invoice qualifies for a rebate by calculating the total transaction amount according to Equation (1), followed by determining the total amount of credit to be enqueued according to Equation (2), as indicated by block 226;

$$Cr=(Cr_e-Cr_0)_1+(Cr_e-Cr_0)_2+(Cr_e-Cr_0)_3+(Cr_e-Cr_0)_4+ \quad (1)$$

wherein Cr is the total transaction amount, $Cr_0$ is the amount of available game credits at time of entering a game, and $Cr_e$ is the amount of game credits left at time of exiting the same game; $(Cr_e-Cr_0)_1$ refers to the game result of the first game session, and likewise, $(Cr_e-Cr_0)_2$ refers to the game result of the second game session, etc.

In the case of rebating only the losing players, invoices resulting in a negative Cr value are subject to the second calculation for rebate queuing, and those with a positive or zero Cr are sent to and stored in the databases of the Server.

$$E_{cr}=\|Cr\|\times d \quad (2)$$

wherein $E_{er}$ is the total amount of credits to be enqueued, $\|Cr\|$ is the absolute value of the total transaction amount, and d is the extracted discount rate.

As shown in the example indicated by block 227, for an invoice having a total transaction amount of 7,770 and an extracted discount rate of 10%, the total amount of credit to be enqueued is 770.

Once the enqueuing amount is determined, the division unit 143 divides the credit according to the decimal number system, as indicated by block 228; for example, referring again to block 237, a total enqueuing credit of 777 will be divided into 3 values, including 700, 70, and 7; likewise, 4040 credits will be divided into 4000 and 40.

Upon the division of the enqueuing credit, the queue unit 144 adds a new queue number to each corresponding rebate queue, or Line, and assigns the queue numbers to the associated invoice, as indicated by block 230; for example, as indicated by block 231, all possible queues of the hundreds are 100, 200, 300, 400, 500, 600, 700, 800, and 900, and all possible queues of the tens are 10, 20, 30, 40, 50, 60, 70, 80, and 90; the same rule applies to all queues of other decimal places. Consequently, in the case of 3 divided values: 700, 70, and 7, Line 700, Line 70, and Line 7 will be each added one new queue number, as indicated by the bold arrows in block 231; and if Line 700 has n queue numbers, n+1 will be assigned to the associated invoice as the queue number for Line 700. Therefore, for the example shown in block 227 and 231, n+1, m+1, and p+1 will be assigned to Invoice 1,234, 567. Also, note that the Lines are queued according to the invoice number; in other words, invoices having smaller invoice numbers enter the Lines earlier and obtain smaller queue numbers, which means that players associated with those invoices will receive their rebate credits earlier than others who associate with invoices entered the system at a later time point.

Once a new queue number enters a Line, the rebate number calculation unit 145 calculates the current rebate number of that Line according to Equation (3), as indicated by block 232;

$$R=L_q\div\lambda \quad (3)$$

where in R is the current rebate number, $L_q$ is the newly added queue number, and λ is the cycle number of the Line.

If the resulting R is an integer, the rebate number calculation unit 145 indicates to the proceeding units that the system is ready to release a rebate to the player associated with Queue No. R of that specific Line. On the contrary, if the resulting R is not an integer, the rebate number calculation unit 145 signals the system to continue waiting for more queue numbers to enter the Line and not to release a rebate to any player associated with the Line at the moment.

Referring to the example illustrated in FIG. 5B, where the cycle number λ of Line X 242 is 10; when Queue No. 30 244 enters Line X, the rebate number calculation unit 145 immediately calculates: $R=L_q\div\lambda=30\div10=3$. Since 3 is an integer, the rebate number calculation unit will signal the system that it is ready to release rebate 246 to the player associated with Queue No. 3 248. However, when Queue No. 31 later enters Line X, calculation performed by the rebate number calculation unit will give: $R=L_q\div\lambda=31\div10=3.1$, which is a non-integer; consequently, the rebate number calculation unit will signal the system to continue waiting for more queue numbers to enter Line X. Accordingly, the next queue number to receive a rebate in Line X will be Queue No. 4, that is, when Queue No. 40 later enters the Line.

In addition to regular queuing, an optional special number setup unit may preset one or a series of special numbers. An invoice having a queue number that meets at least one of the criteria of a special number may skip the Line immediately, meaning that the associated player may receive an instant rebate. However, when that queue number later becomes a current rebate number, the system will not release a second rebate to the associated player.

When the current rebate number calculated by the rebate number calculation unit 145 becomes an integer, as indicated by block 234, the fee calculation unit 146 calculate the actual amount of rebate credit to be released to the associated player according to Equation (4), as indicated by block 236;

$$A_{cr} = E_{enq} \times \lambda \times (1-f) \quad (4)$$

where $A_{cr}$ is the actual amount of rebate credits, $E_{enq}$ is the amount of credit each queue number enqueued to a Line, $\lambda$ is the cycle number of the Line, and f is the transaction fee rate extracted by the extraction unit 141.

Referring again to the example indicated by block 235 in FIG. 5A, when Queue No. n+1 becomes the current rebate number of Line 700, assuming that the cycle number of Line 700 is 10 and the transaction fee rate is 10%, the actual amount of rebate received by the player associated with Invoice 1,234,567 will be 700×10×90%=6,300 credits. Likewise, when the other 2 numbers, 70 and 7, associated with Invoice 1,234,567 later become the current rebate numbers of their respective Lines, the player associated with the invoice will receive 630 and 63 credits, respectively, resulting in a total of 6,993 rebate credits received for an overall game lose of 7770 credits. Such high return of game credits strongly promotes gambling players to return to the casino games, thus effectively improving the customer return rate of the participating casino(s).

After the actual amount of rebate credits is determined, the rebate unit 147 will transfer the credits to the credit account 114 of the player associated with the rebating invoice via the Internet, as indicated by block 250 in FIG. 5A. In accordance with one embodiment of the present invention, FIGS. 3 and 6 illustrates that upon the entrance of a rebate credit into the associated player's credit account 114, as indicated by block 260, the cash-in control unit 152 will activate and block the transferring of the rebate credit from the credit account to the debit account 112 for a predetermined duration of holding time, preferably 1 month, as indicated by blocks 252 and 256. After the predetermined holding time has passed, the cash-in control unit will be deactivated, allowing the player to transfer the rebate credits to his/her debit account and cash-in those credits at any time at a cashier in the casino.

The rebate credit holding time provides players an additional incentive to return to the casino games, which could also effectively enhance the customer return rate of the participating casino(s). The duration of time for which the rebate credits are held in the credit account may be determined according to each casino's need or the agreement between the casino(s) and the rebate queuing platform of the present invention, and may be adjusted via the internal management system 154 at the Casino Manager End 150.

Besides rebating the losing players, it should be appreciated that the rebate queuing method of the present invention as described above may also be used to award game winners, providing a novel and innovative reward mechanism to the gambling industry.

Moreover, when the rebate credits enters a player's credit account, as indicated by block 260 in FIG. 6, the rebate queuing system of the present invention may send a confirmation notice to one or more of the player's electronic communication devices, as indicated by block 254, to inform the player of the release of a certain amount of rebate credit and the expiration date for the credit holding, thus prompting the player to return to the casino games more timely. Furthermore, at some casinos affiliated with the rebate queuing platform of the present invention, rebate credits earned from casino games may be used on lodging in the casino hotels or other related services, therefore more effectively lengthening the patrons' stay at the casino properties.

Baccarat Game Example Embodiment

Figure 7:
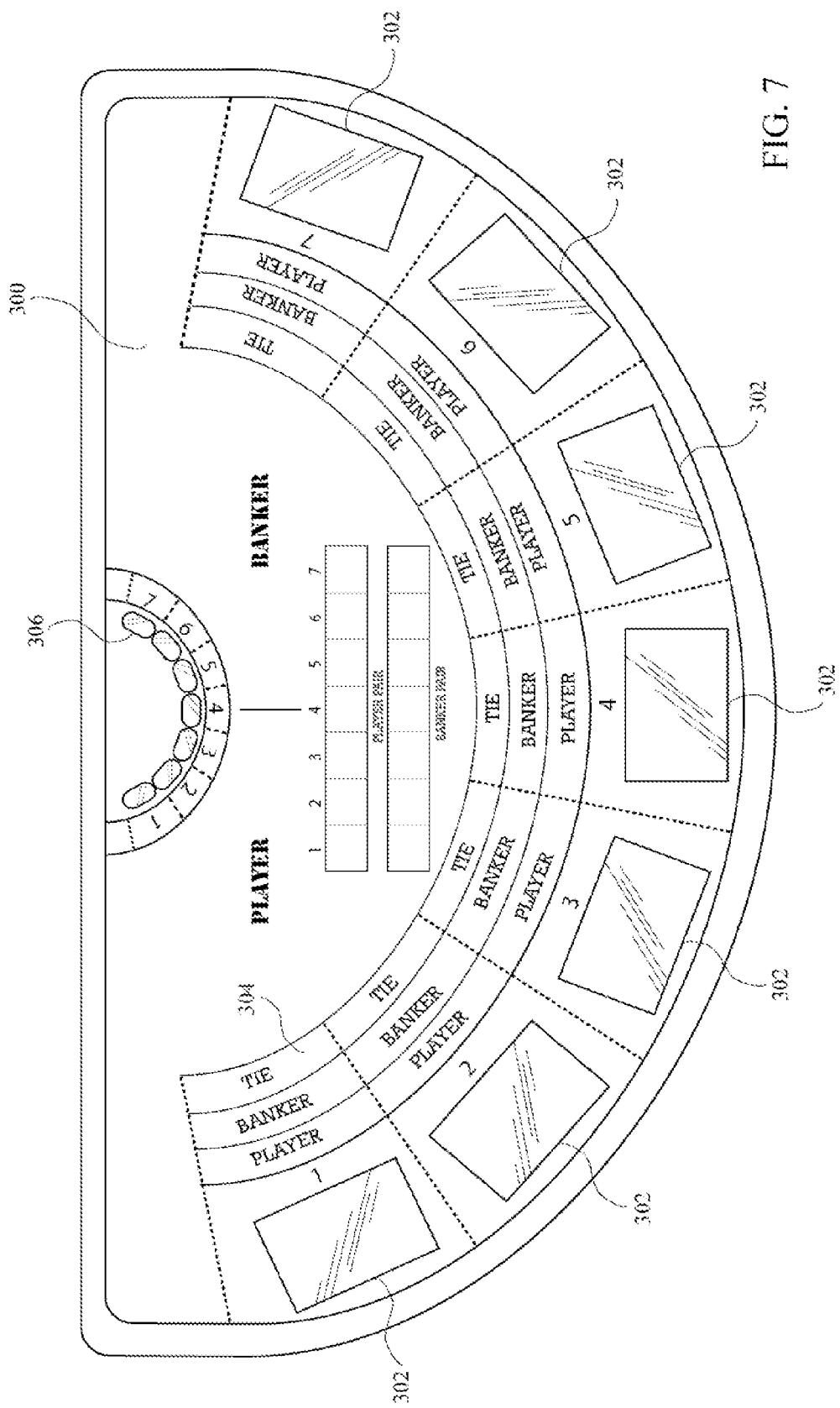
FIG. 7 is a perspective view of an electronic Baccarat game table in accordance with an exemplary embodiment of the present invention.

Referring now to FIG. 7 through 9, an electronic Baccarat game table that operates in accordance with a preferred embodiment of the present invention is illustrated. FIG. 7 illustrates the upper surface of an electronic Baccarat game table 300 having individualized touch screen display 302 installed at each player position, a large display 304 covering the betting area of the game table, and a plurality of small displays 306 installed at the dealer position. It should be appreciated that the game table may have a variable number of player positions and the number is not limited to the seven illustrated in FIGS. 7 and 9D.

Figure 8A:
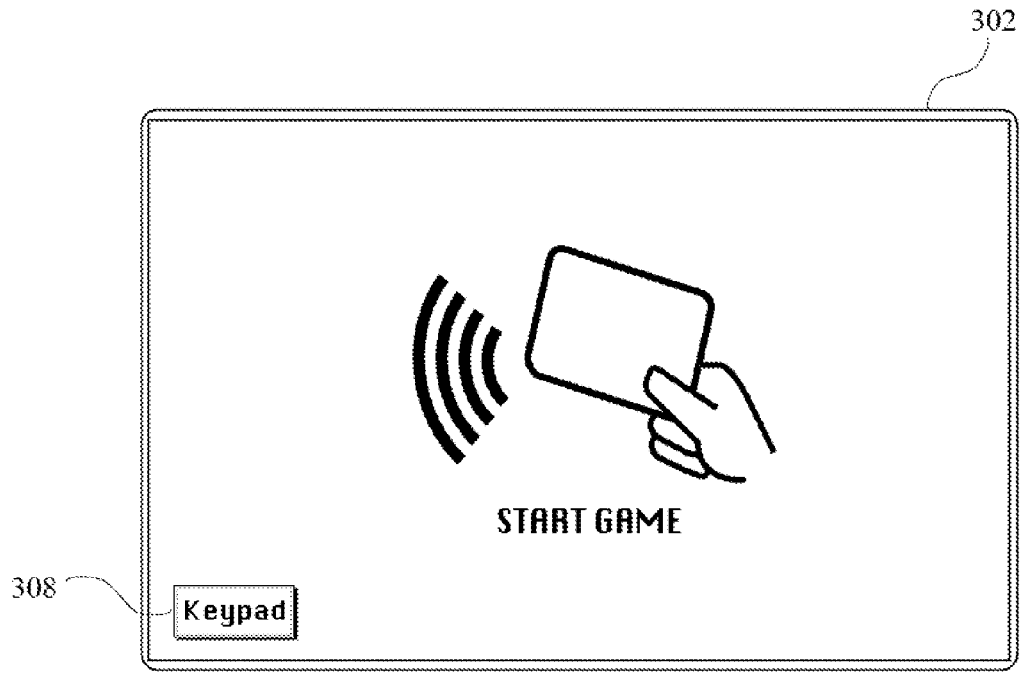
FIGS. 8A and 8B are simulated illustrative displays at a player position from FIG. 7 before a player entering the game in accordance with an exemplary embodiment of the present invention.
Figure 8B:
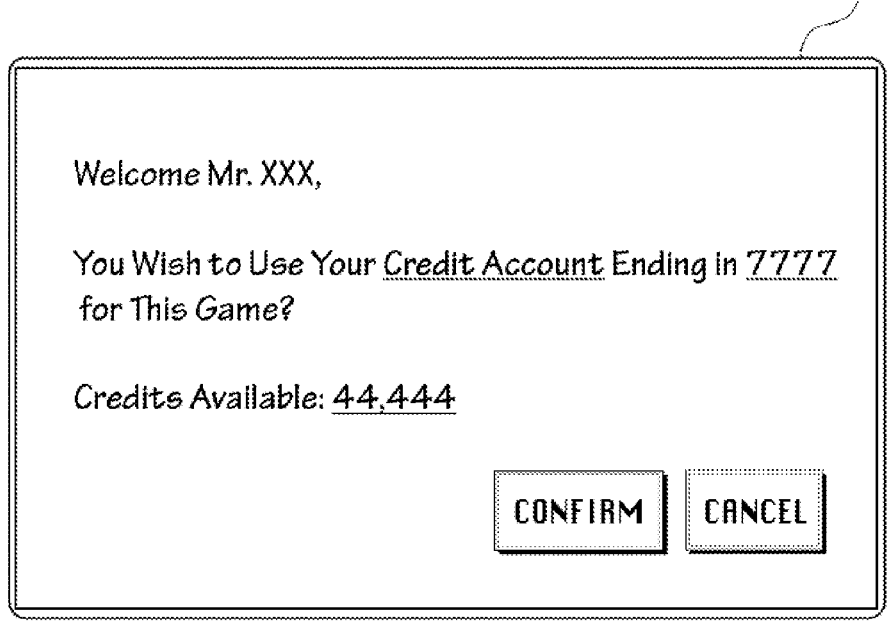

A contactless card sensor is also incorporated into the individualized touch screen display 302. To start game, a registered player is prompted to put the game card, associated with the player's debit or credit account, in close proximity of the screen 302, as illustrated in FIG. 8A; in the case of unreadable card or card sensor malfunction, the player may also manually key in the account number via the virtual keypad 308 portrayed on the touch screen display 302. As shown in FIG. 8B, once the card sensor detects the card signal, the screen 302 displays player name, account type, and partial account number associated with the detected game card, and available credits in the account; the player may confirm the displayed information by selecting the "Confirm" option.

Figure 9A:
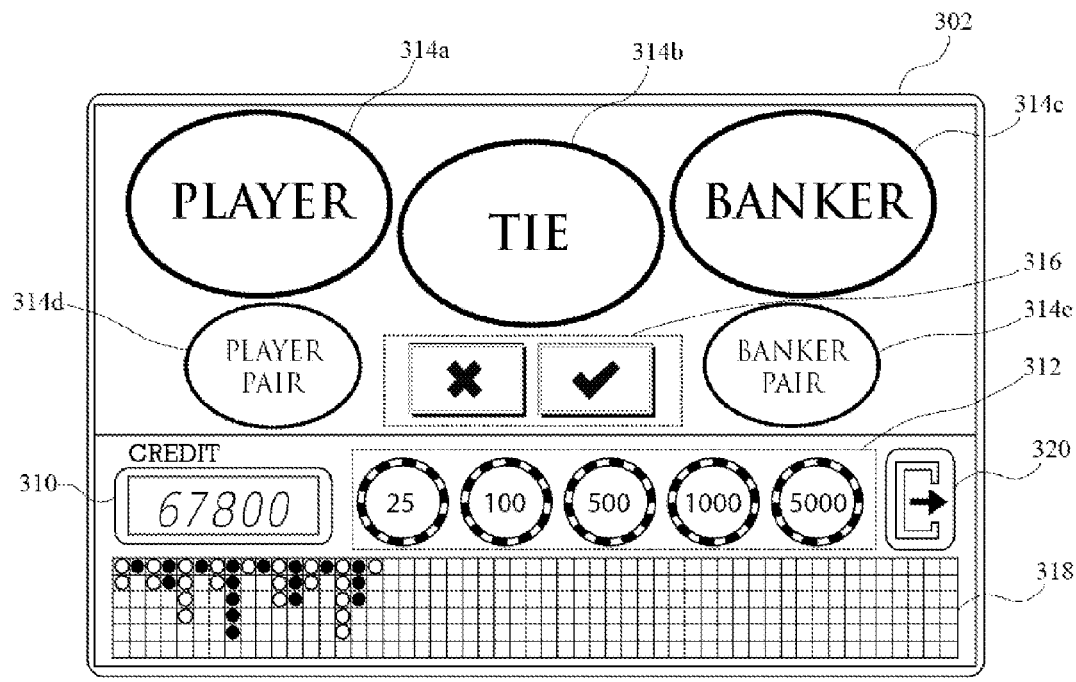
FIG. 9A is a simulated illustrative display at a player position from FIG. 7 after a player entering the game in accordance with an exemplary embodiment of the present invention.
Figure 9B:
FIG. 9B is a simulated illustrative display at the dealer position from FIG. 7 after a player entering the game in accordance with an exemplary embodiment of the present invention.

Upon confirmation, the identified player is presented with a straightforward and easily comprehensible betting interface, as illustrated in FIG. 9A, including the available credits in the account 310, betting options 314a through 314e, and virtual chips 312. The player may place bets by selecting or touching (i) 314a through 314e to indicate which option to bet on, and (ii) 312 to indicate how much credits to bet; the player may clear or confirm each bet via the virtual buttons 316. Result bar 318 is also available on the display for the player to follow the previous game results. The player may exit the game via the exit icon 320 before each game session starts and after each game result is revealed. FIG. 9B illustrates the small display at the dealer position 306 indicating the instant house credit to the dealer during game play with the player sitting at the opposite position.

Figure 9C:
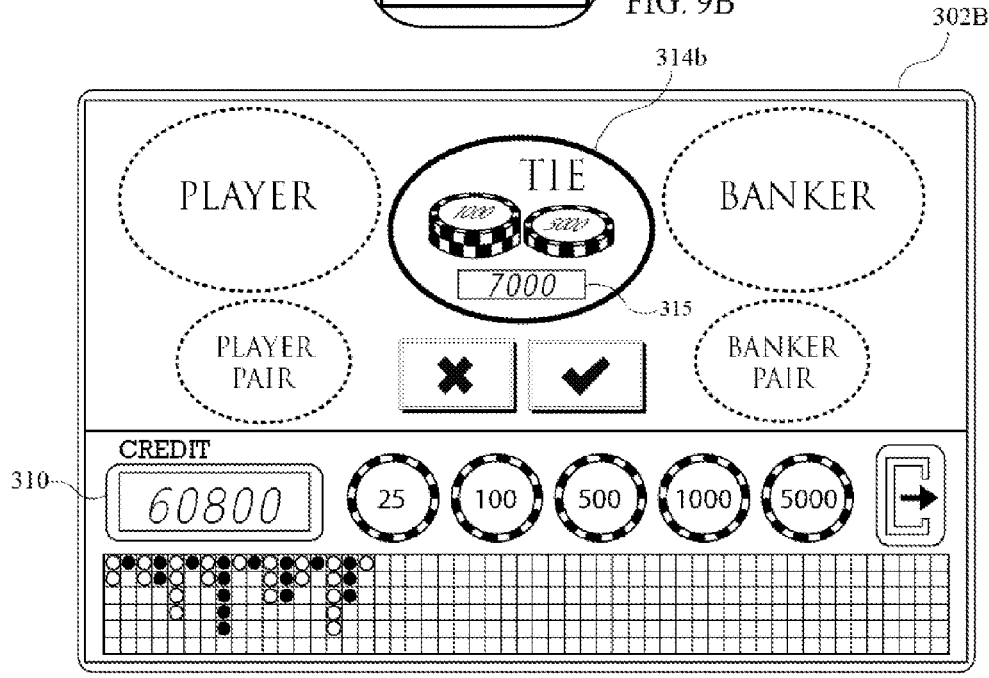
FIG. 9C is a simulated illustrative display at a player position from FIG. 7 after a player placing a bet to the game in accordance with an exemplary embodiment of the present invention.
Figure 9D:
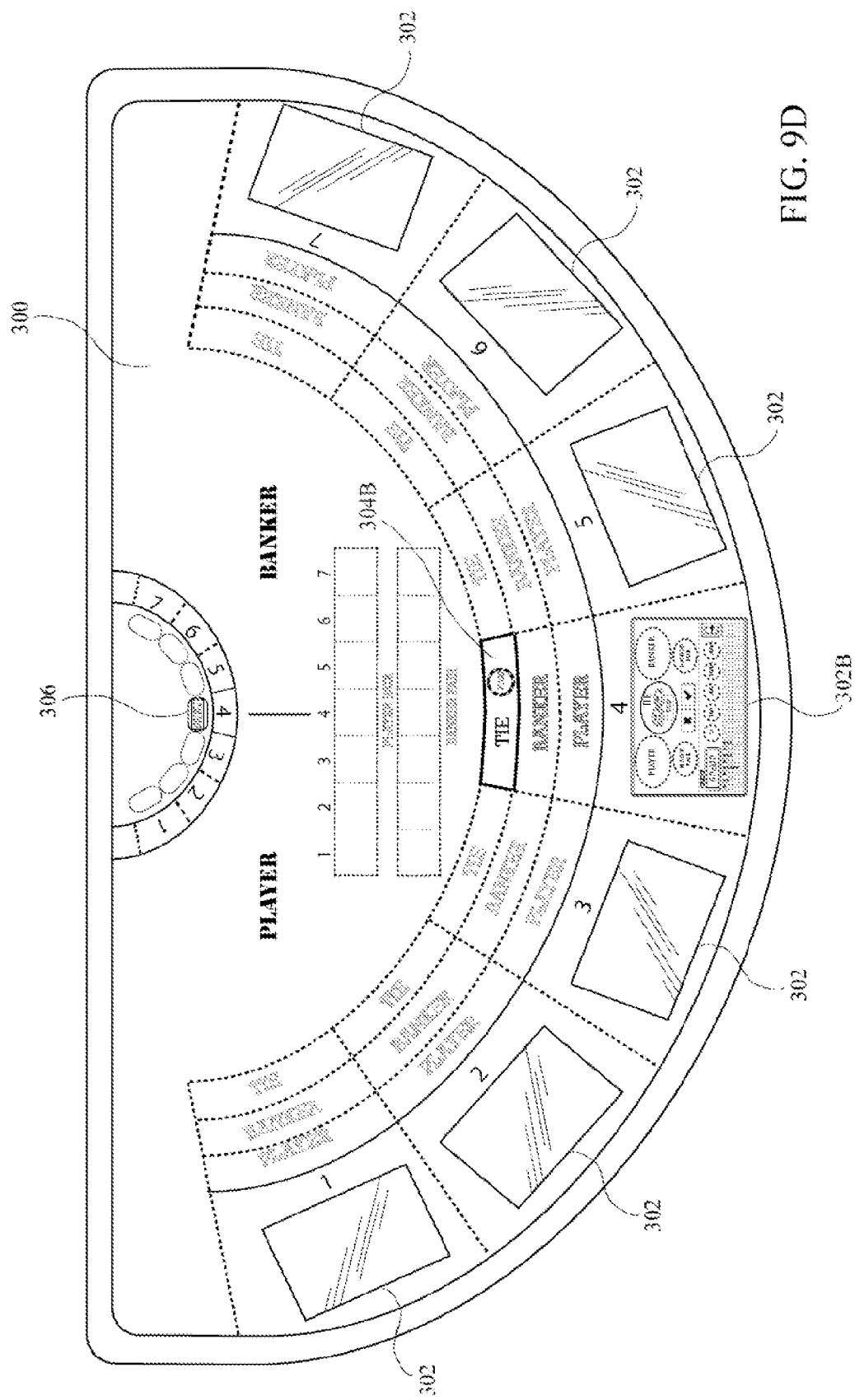
FIG. 9D is a perspective view of an electronic Baccarat game table after a player placing a bet to the game in accordance with an exemplary embodiment of the present invention.

With reference to FIG. 9C, when the player places his/her bet via the touch screen display 302, the selected option will be highlighted, as illustrated in oval 314b. The highlighted area shows virtual casino chips and a numeric representation 315 of the amount of wager to be placed, and the available credit in the account is instantly reflected on 310. FIG. 9D illustrates a perspective view of the electronic Baccarat game table 300 while players placing bets; the betting will also be displayed and highlighted on the large display covering the betting area 304B, so that other players on the same game table may feel more engaged in the game play. Also note that although only the screen view at position 4 is illustrated in FIG. 9D, it should be appreciated that the displays at other player positions on the game table may exhibit the same or similar view.

The player may exit the game by touching the exit icon 320, and start one or more new game sessions on other electronic game tables or electronic gaming machines. After reaching the 24-hour mark since the player enters his/her first game session at the casino property, the player will receive a confirmation message on his/her cell phone and/or email notifying that his/her gaming transactions took place in the casino during the past 24 hours has entered the rebate queuing system and prompting the player to visit the rebate queuing platform website to view details of the gaming transaction and to follow up on the rebate queuing statuses associated with his/her current and past gaming transactions. If the player lost money on the games during the past 24 hours, he/she will receive another confirmation notice on his/her cell phone and/or email after rebate credits associated with the gaming transaction have entered the player's credit account.

The Rebate Queuing Platform

Figure 10:
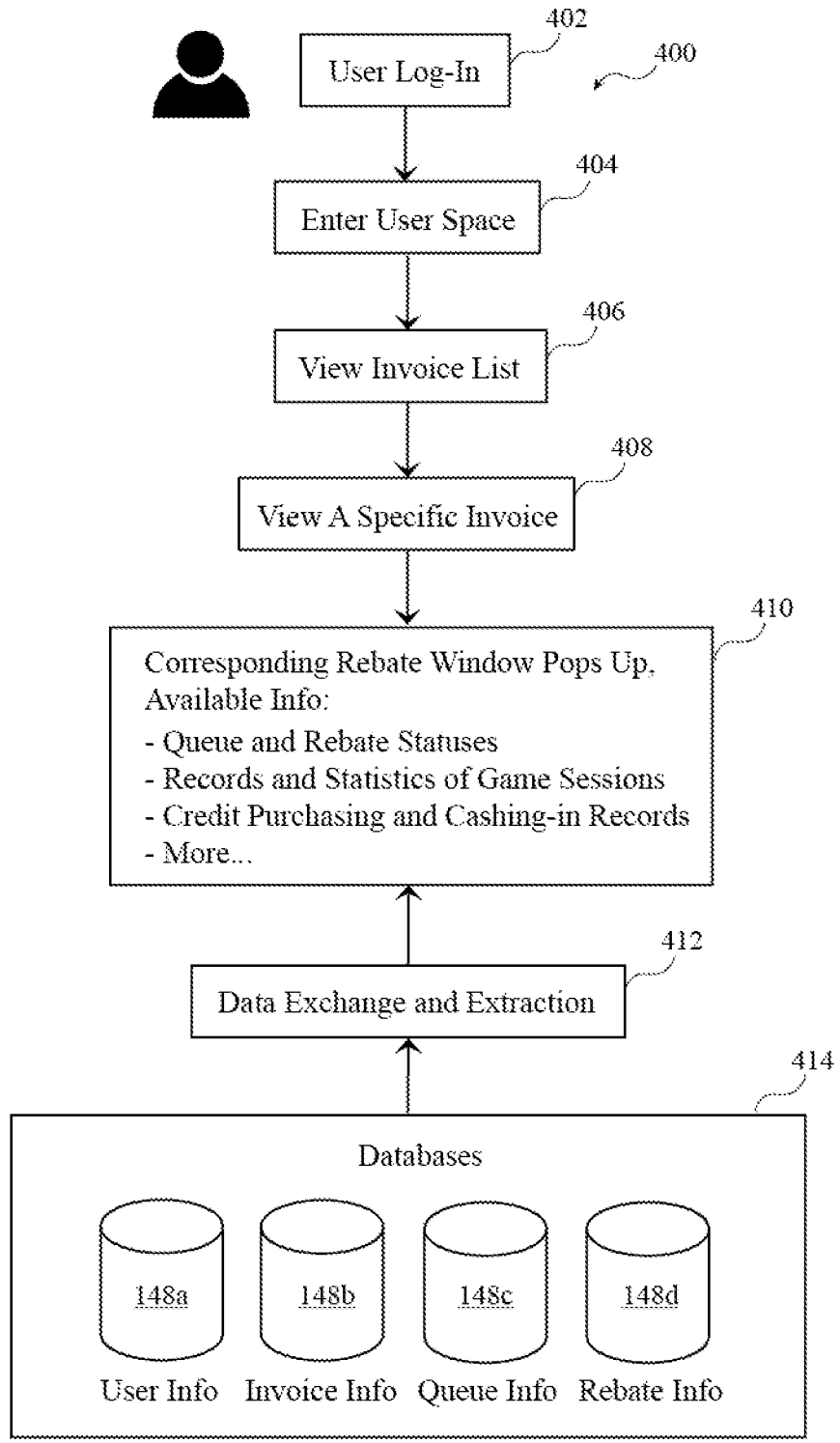
FIG. 10 is a block diagram illustrating one sequence of accessing the rebate queuing platform of one embodiment of the rebate queuing system of the present invention.

Referring now to FIG. 10, in which the steps of a rebate queuing platform user accessing the information made available to him/her on the platform website are illustrated in accordance with an preferred embodiment of the present invention. A registered user logs on to the rebate queuing platform website by entering information associated with his/her user account, such as account number, user name, password, etc., as indicated by block 402. Once the entered information is verified, the user is securely logged on to his/her user space on the website, as indicated by block 404. In the user space, the user is presented with a list of invoices associated with his/her past gaming transactions, as indicated by block 406. Each listed invoice is hyperlinked to a Rebate Window displaying the user the most updated information associated with the selected invoice, which may include, but is not limited to, date, time, and location of the gaming transaction, type of game played, instant queue and rebate statuses, receipt date or expected receipt date of the rebate credits, and expiration date of the rebate credits holding, as well as winning/losing records and statistics of the past game sessions, records on purchasing and cashing in game credits, etc., as indicated by blocks 408 and 410.

In addition, user database, invoice database, queue database, and rebate database are adapted to store data related to user information, invoice details, queue records, and rebate records, respectively, as indicated by block 414. These data may be used for or be obtained through rebate queuing related calculations, and are presented to the user via data exchange and extraction, as indicated by block 412.

With these straightforward approaches, the rebate queuing process is transparent and fair to the platform users; and by allowing the users to access his/her past game play records and analyses, the platform may be helpful in improving users gaming or business operating strategies as well. The rebate queuing platform may also post website entrances and/or business logos of affiliated casinos on the platform website so to effectively direct the users to visit the casino websites.

In one or more embodiments of the present invention, units of the rebate queuing system may include circuits configured to execute the required programs provided by appropriate media. For example, units of the rebate queuing system may implement one or more processor(s), and/or other mechanisms configured to execute executable instructions (such as software and/or hardware instructions), and/or hardware circuits. An exemplary embodiment of the units of the rebate queuing system may include, but is not limited to, hardware logic, PGA (programmable gate array), FPGA (field programmable gate array), ASIC (application specific integrated circuit), status machine, and/or other mechanisms or combinations with the processors.

In some embodiments of the present invention, units of the rebate queuing system may include storage circuit or external storage circuit (figure not shown). Storage circuit is configured to store programs, such as executable codes or instructions for software and/or hardware, digital data, database, or other digital information, and may include processor-usable medium. The processor-usable medium may implement any computer program products or manufactures capable of the inclusion, storage, or maintenance of programs, data, and/or digital information, which may be used by, or associated with, the instruction execution system for units of the rebate queue management system of the exemplary embodiments. An exemplary processor-usable medium may comprise any one of the physical media, including electrical, magnetic, optical, electromagnetic, infrared, or semiconductive medium. More specifically, a processor-usable medium may include, but is not limited to, portable computer disc, such as softdisk, compressed (zip) disk, hard drive, random access memory (RAM), read only memory (ROM), flash memory, cache memory, and/or other configurations capable of storing programs, data, or other digital information.

Some embodiments of the present invention may be implemented by using programs which store in the appropriate storage circuits described above and are configured to control the appropriate units in the rebate queuing system. Appropriate medium, including the medium implemented in manufactures, may be used to provide these programs.

In sum, the present invention offers an innovative and scientific queue management technique to provide fast and large game credits returns to gambling players at casino properties around the world. The present inventions also offers an effective solution to the gambling industry on the improvement of customer return rates, expanding customer bases, and strengthening business competitiveness.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

Furthermore, while certain features of the invention have been illustrated and described herein, many modifications, substitutions, changes, and equivalents may occur to those skilled in the art. It will be, therefore, apparent to those skilled in the art that various modifications and variations can be made to the embodiments of the disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A system for pooling, queuing and redistributing rebates among players of casino games, comprising:
  a player end having at least one debit account and one credit account for each of said player;
  a gaming terminal having an electronic gaming interface and a card reading device, wherein said card reading device is coupled to said electronic gaming interface and in communication with said debit account and said credit account at said player end to identify said players;
  a game server having a cache unit, an invoice generating unit, and a communication unit, wherein said cache unit is in communication with said card reading device and said electronic gaming interface to temporarily store game play data of an identified player, said invoice generating unit is coupled to said cache unit to generate an invoice associated with said identified player and said game play data once a predetermined duration of recording time is reached, and said communication unit is coupled to said invoice generating unit to receive and deliver said invoice;

a rebate queue management server having an extraction unit, an enqueuing credit calculation unit, a division unit, a queue unit, a rebate number calculation unit, a fee calculation unit, and a rebate unit, wherein said extraction unit is in communication with said communication unit to extract information provided contained in said invoice, said enqueuing credit calculation unit is coupled to said extraction unit to determine if said invoice qualifies for a rebate and to calculate an amount of credit to be enqueued based on game results and a discount rate extracted from said invoice, said division unit is coupled to said enqueuing credit calculation unit to divide said amount of credit to be enqueued according to the decimal number system into a plurality of values, said queue unit is coupled to said division unit to add a new queue number to each of a plurality of rebate queues related to said values and assign said new queue number to said invoice, said rebate number calculation unit is coupled to said queue unit to calculate a current rebate number upon the entrance of said new queue number into said rebate queue, said fee calculation unit is coupled to said extraction unit and said rebate number calculation unit to determine an amount of rebate credit to be released to said identified player based on one of said values and a cycle number and a transaction fee rate extracted from said invoice, and said rebate unit is coupled to said fee calculation unit and in communication with said credit account at said player end to transfer said amount of rebate credit into said credit account of said identified player.

2. The system of claim 1, further comprising:
a cash-in control unit at a casino manager end in communication with said credit account at said player end to block the transferring of said amount of rebate credit from said credit account of said identified player to said debit account of said identified player for a predetermined duration of holding time.

3. The system of claim 1, wherein:
said discount rate falls between the range of 0.1%-99.9%, inclusive,
said cycle number is any natural number larger than 1,
said transaction fee rate falls between the range of 0.1%-99.9%, inclusive, and
said predetermined duration of recording time is 24 hours.

4. The system of claim 2, wherein said predetermined duration of holding time is 1 month.

5. The system of claim 1, wherein said electronic gaming interface is a Baccarat game table.

6. The system of claim 1, wherein said electronic gaming interface is a Blackjack game table.

7. The system of claim 1, wherein said electronic gaming interface is a Roulette game table.

8. The system of claim 1, wherein said electronic gaming interface is a Poker game table.

9. The system of claim 1, wherein said electronic gaming interface is a Craps game table.

10. The system of claim 1, wherein said electronic gaming interface is a slot machine.

11. The system of claim 1, wherein said electronic gaming interface is a Pachinko machine.

12. The system of claim 1, wherein said electronic gaming interface is an online casino.

13. A method for pooling, queuing and redistributing rebates among players of casino games, comprising the steps of:

identifying said players via a card reading device coupled to an electronic gaming interface at a gaming terminal;

once an identified player starts game play at said electronic gaming interface, caching data of each game session played by said identified player by a cache unit at a game server;

after reaching a predetermined duration of recording time, generating an invoice containing information related to all terminated game sessions of said identified player by an invoice generating unit at said game server;

sending said invoice to a communication unit at said game server;

extracting information from said invoice received from said communication unit by an extraction unit at a rebate queue management server;

determining if said invoice qualifies for a rebate and calculating an amount of credit to be enqueued based on a total transaction amount and a discount rate extracted from said invoice by enqueuing credit calculation unit at said rebate queue management server;

dividing said amount of credit to be enqueued according to the decimal number system into a plurality of values by a division unit at said rebate queue management server;

adding a new queue number to each of a plurality of rebate queues related to said values and assigning said new queue number to said invoice by a queue unit at said rebate queue management server;

upon the entrance of said new queue number into said rebate queue, calculating a current rebate number by a rebate number calculation unit at said rebate queue management server;

when said new queue number becomes said current rebate number, determining an amount of rebate credit to be released to said identified player based on one of said values and a cycle number and a transaction fee rate extracted from said invoice by a fee calculation unit at said rebate queue management server; and transferring said amount of rebate credit into a credit account associated with said identified player by a rebate unit at said rebate queue management server.

14. The method of claim 13, further comprising the step of:
blocking the transferring of said amount of rebate credit from said credit account to a debit account associated with said identified player for a predetermined duration of holding time by a cash-in control unit at a casino manager end.

15. The method of claim 13, wherein:
said discount rate falls between the range of 0.1%-99.9%, inclusive,
said cycle number is any natural number larger than 1,
said transaction fee rate falls between the range of 0.1%-99.9%, inclusive, and
said predetermined duration of recording time is 24 hours.

16. The method of claim 14, wherein said predetermined duration of holding time is 1 month.

17. The method of claim 13, wherein said electronic gaming interface is a Baccarat game table.

18. The method of claim 13, wherein said electronic gaming interface is a Blackjack game table.

19. The method of claim 13, wherein said electronic gaming interface is a Roulette game table.

20. The method of claim 13, wherein said electronic gaming interface is a Poker game table.

21. The method of claim 13, wherein said electronic gaming interface is a Craps game table.

22. The method of claim 13, wherein said electronic gaming interface is a slot machine.

23. The method of claim 13, wherein said electronic gaming interface is a Pachinko machine.

24. The method of claim 13, wherein said electronic gaming interface is an online casino.

* * * * *